May 24, 1955     H. A. LESSARD     2,709,012
METHOD FOR HANDLING AND STORING SHEETS OF MATERIAL
Original Filed June 19, 1951     4 Sheets-Sheet 1

INVENTOR.
HERVE A. LESSARD.
BY
*Louis V. Lucia*
ATTORNEY.

May 24, 1955 H. A. LESSARD 2,709,012
METHOD FOR HANDLING AND STORING SHEETS OF MATERIAL
Original Filed June 19, 1951 4 Sheets-Sheet 2
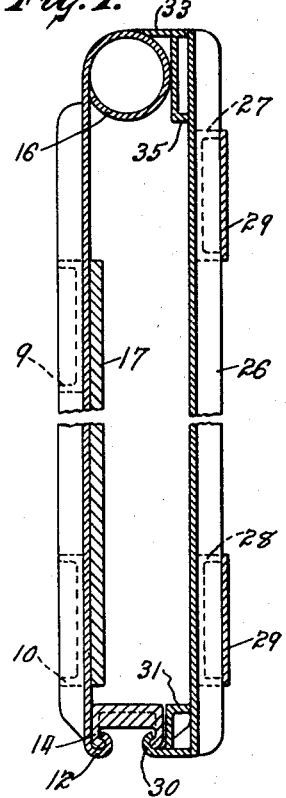
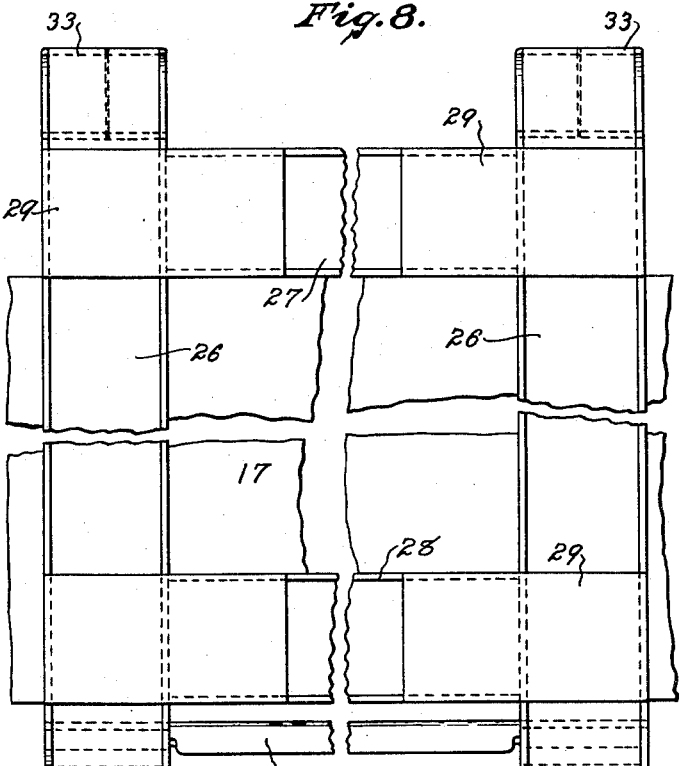
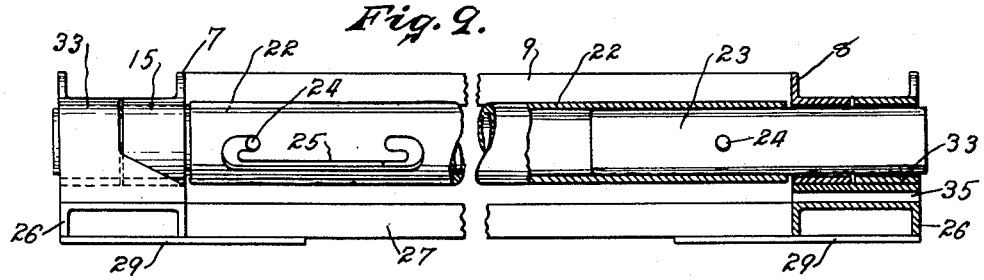
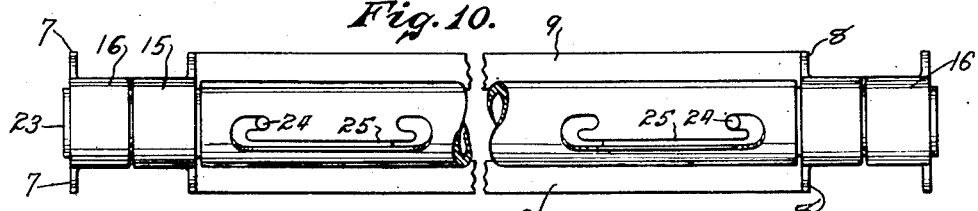
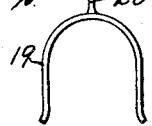
INVENTOR.
HERVE A. LESSARD.
BY
*Louis V. Lucia*
ATTORNEY.

May 24, 1955 H. A. LESSARD 2,709,012
METHOD FOR HANDLING AND STORING SHEETS OF MATERIAL
Original Filed June 19, 1951 4 Sheets-Sheet 3
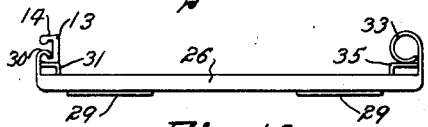
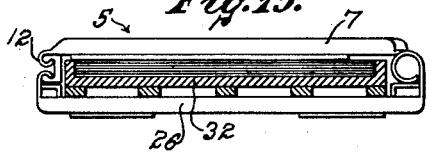
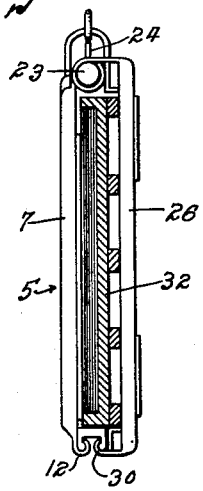
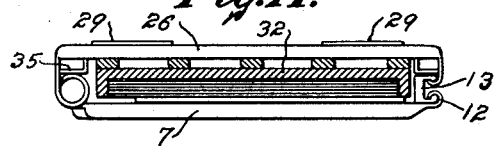
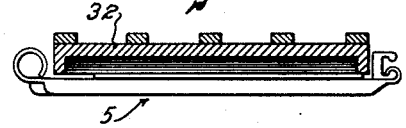
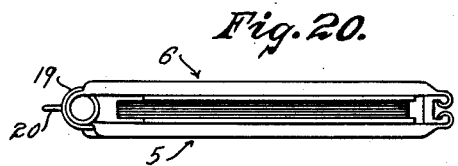
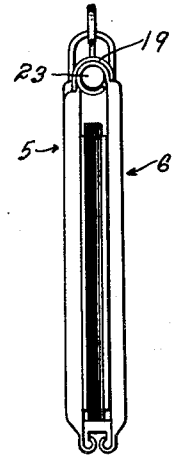
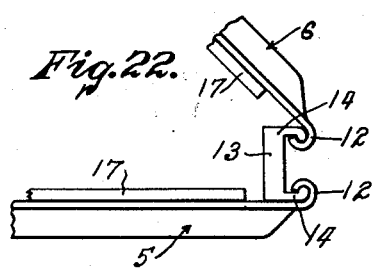
INVENTOR.
HERVE A. LESSARD.
BY
ATTORNEY.

May 24, 1955   H. A. LESSARD   2,709,012
METHOD FOR HANDLING AND STORING SHEETS OF MATERIAL
Original Filed June 19, 1951   4 Sheets-Sheet 4

INVENTOR.
HERVE A. LESSARD.
BY
*Louis V. Lucia.*
ATTORNEY.

United States Patent Office 2,709,012
Patented May 24, 1955

2,709,012

METHOD FOR HANDLING AND STORING SHEETS OF MATERIAL

Herve A. Lessard, East Hartford, Conn.

Original application June 19, 1951, Serial No. 232,304. Divided and this application October 23, 1952, Serial No. 316,340

5 Claims. (Cl. 214—152)

This invention relates to a Method for Handling and Storing Sheets of Material such as heavy metal sheets and the like and the present application is a division of my co-pending application Serial No. 232,304 filed June 19, 1951, for Apparatus for Handling and Storing Sheets of Material.

It is well known by those experienced in the handling and storing of packs of metal sheets, that it is very difficult to handle and store such packs due to their heavy weight and also due to the fact that they are usually stored by stacking the packs on the floor, in order to economize floor space.

When the packs of sheet metal are thus stored, and it is desired to obtain one or more sheets from a pack which is stored under another pack, or several of them, the packs above the one from which the sheet is wanted first have to be removed in order to permit access to the desired sheet and this requires the expenditure of a considerable amount of time and labor. Also, due to the fact that passageways have to be provided between the stacks of sheet metal packs, a great amount of floor space is wasted.

The conventional manner of handling and storing sheet metals has been particularly objectionable in cases where it is frequently desired to remove a single sheet, or a piece thereof, for testing purposes before the entire pack is needed and this has resulted in a great deal of inconvenience and waste of time for the reason that it is often necessary to first remove several packs from above the one from which a sheet is wanted before access can be had to that sheet.

It is an object of this invention, therefore, to provide a novel method for handling and storing sheet metal in such a manner as to greatly facilitate the handling of the heavy packs of metal sheets so that they may be removed from their original shipping crate and deposited in a rack, from which the said sheets may be easily withdrawn as needed with full accessibility and without requiring the removal of other packs of material in order to render the sheets in the rack accessible.

Further objects and advantages of my invention will be more clearly understood from the following description and the accompanying drawings in which:

Fig. 7 is a view similar to Fig. 3 but showing the use of the transfer frame used in connection with said folder.

Fig. 8 is a side view of the folder and transfer frame as shown in Fig. 7.

Fig. 9 is a plan view showing the said folder and transfer frame as in transit.

Fig. 10 is a plan view showing my improved folder while in transit.

Fig. 11 is an end view of the holding clip used in connection with said folder.

Fig. 12 is a side view of said clip.

Fig. 13 is an end view of the transfer frame.

Fig. 14 is a similar view showing a shipping crate in section with a pack of metal sheets therein and in upright position on said transfer frame.

Fig. 15 is a similar view showing a portion of the folder attached to the transfer frame.

Fig. 16 is an end view showing the said folder portion, frame and crate in an upright position as it is being inverted with the hoist bar attached thereto.

Fig. 17 is an end view showing the said folder portion, frame and crate in an inverted position upon the floor.

Fig. 18 is a similar view showing the side member of the folder with the crate inverted thereon and the transfer rack removed therefrom.

Fig. 19 is a similar view showing the crate removed and the pack remaining upon the side member of the folder.

Fig. 20 is a similar view showing the other side member attached to the folder and held in closed position by means of the holding clips.

Fig. 21 is an end view showing the closed folder being moved to the floor rack by the hoist.

Fig. 22 is an end view of a bottom portion of the folder and showing the side members assembled to the bottom bar.

Figure 1:
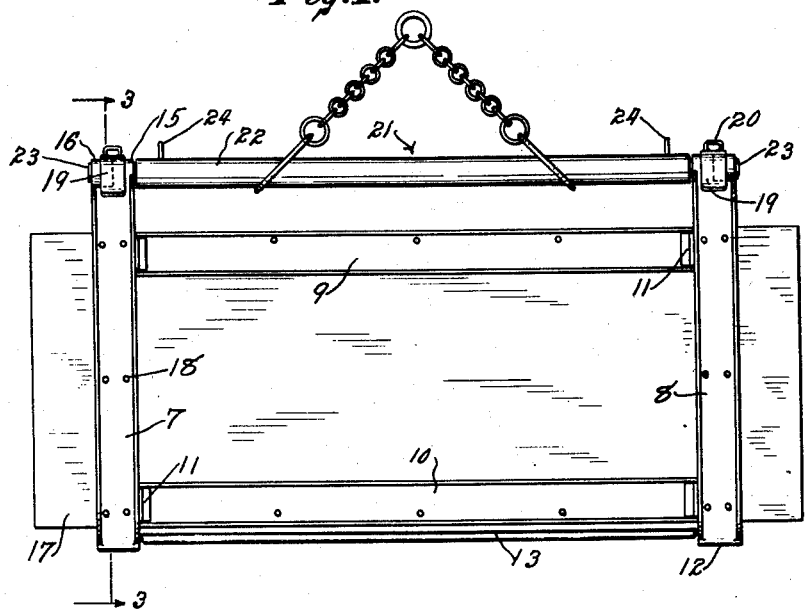
Fig. 1 is a side view of my improved folder showing the same supported from a hoisting bar provided therefor.
Figure 2:
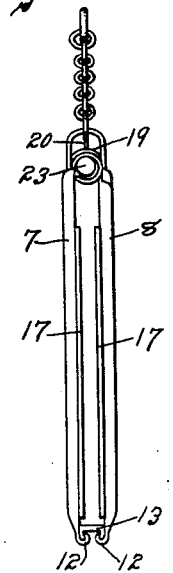
Fig. 2 is an end view of the said folder shown in Fig. 1.

As shown in the accompanying drawings, the folder preferably used with my invention is constructed of an opposed pair of sides generally indicated at 5 and 6. Each of these sides consists of a frame that is preferably constructed of channel irons and includes upright end bars 7 and 8 which are joined together by intermediate upper and lower horizontal bars 9 and 10, respectively. These bars are preferably secured to the end bars 7 and 8 by welding or the like and corner fastening pieces 11 may also be used if desired.

The lower end of each of the bars 7 and 8 is bent inwardly to provide a hook portion 12 by means of which the said sides are pivotally secured to a common bottom bar 13 which has, along the sides thereof, downwardly depending parallel flanges 14 with inwardly bent portions adapted to be received in the hook portions 12 for swivelly and detachably securing the sides 5 and 6 to the said bottom bar.

The upper end of each of the end bars 7 and 8 is looped inwardly so as to provide the loops 15 and 16, respectively, which are in axial alignment when the folder is in closed position in order to receive a hoist bar as will be hereinafter more fully described.

Each of the said side members 5 and 6 has secured thereto a suitable wall member, or liner 17, which is attached to the inside of the side member by means of suitable fasteners 18.

The above described folder may be retained in closed position by means of U-shaped clips 19 which have a handle 20 and are placed over the looped portions of the end bars 7 and 8 so as to straddle the adjacent loops of the opposed end bars and retain the folder in closed position.

In order to facilitate the moving of the said folder by means of a hoist or the like, I provide a hoist bar, generally indicated at 21, which is constructed of a tubular portion 22 having, at each end thereof, a bolt bar 23 which is slidable in the end of the said tubular portion and may be projected from the said bar through the loops 15 and 16 of the end members when the folder is closed and the said loops are axially aligned as shown particularly in Figs. 9 and 10. Each of said bolt bars has a handle 24 which extends through an elongated slot 25 in the tubular portion 22, and by means of which the bolt bar may be moved. The ends of the said slot are hooked, as shown in Figs. 9 and 10, so as to lock the bolt in either projected or retracted position.

As clearly illustrated in Figs. 7 to 9, a transfer frame may be used in combination with the above described folder for transferring a pack of sheets from their original shipping crate into said folder. This transfer frame is somewhat similar to a side of the folder and is constructed of vertical end bars 26—26 and upper and lower horizontal bars 27 and 28, respectively, which are secured to the said end bars. At each corner of the transfer frame there is provided a foot plate 29 which overlaps the end portions of the horizontal bars and the adjacent vertical bar and is secured thereto to reinforce the said frame and also provide feet for supporting the frame on a floor or a like surface.

Each of the end bars 26—26 is provided at its lower end with a hook portion 30 which extends inwardly from said bar and is adapted to engage the hooked flange 14 of the bottom bar 13. A spacer 31 is provided between the bar 26 and the hook portion 14 to space the frame from the bottom bar so as to accommodate the additional thickness of the bottom of a shipping crate 32 which is received upon said frame during the operation of transferring the sheets from the crate into the folder.

At the top each bar 26 there is provided a looped portion 33 which cooperates with the adjacent loop 15 of the opposite folder side to receive the bolt bar 23 of the hoist bar 22 in the manner above described. Adjacent to the said loop portion 33 there is also provided a spacer 35 which cooperates with the spacer 31 for spacing the transfer frame to compensate for the thickness of the bottom of the crate.

Figure 3:
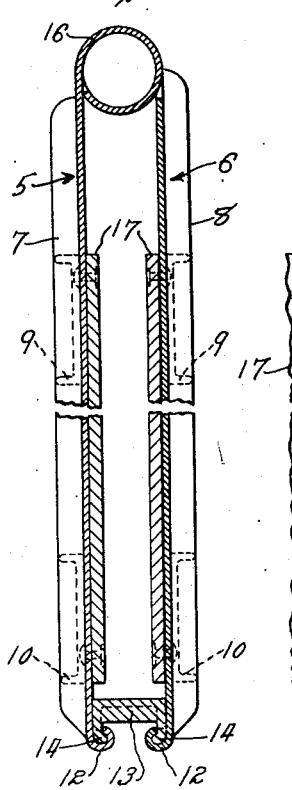
Fig. 3 is an enlarged sectional end view on line 3—3 of Fig. 1, with the fastening clips removed.
Figure 4:
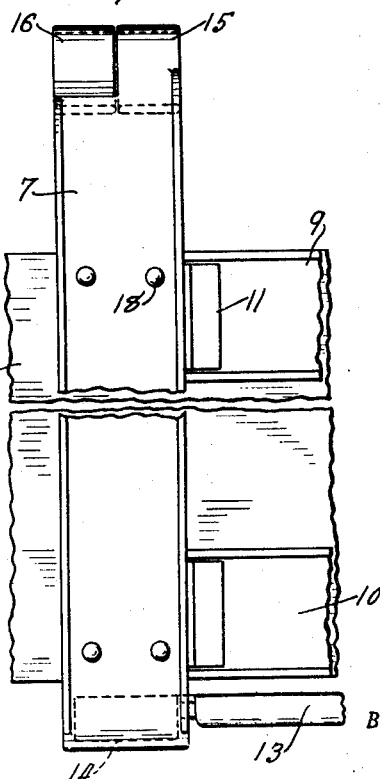
Fig. 4 is an enlarged side view of a portion of said folder.
Figure 5:
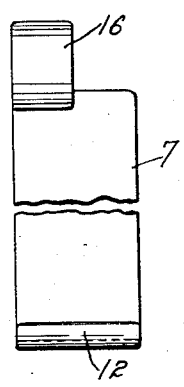
Fig. 5 is a side view of one of the upright members used in the construction of said folder.
Figure 6:
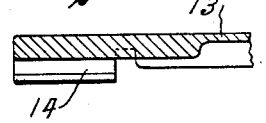
Fig. 6 is a sectional side view of an end portion of the bottom bar of the folder.

The hook portions 12 and 30 of the folder sides and the transfer frame respectively, are adapted to be disconnected from the hooked flanges 14 by simply swinging the side or frame to an angle of approximately forty-five degrees to the bottom bar, as shown in Fig. 22, and then sliding the said side or frame downwardly to separate the hook portion from the bar. It will be noted that when the said side or frame is in its normal closed position, as shown particularly in Figs. 3 and 7, the hook portion cannot become disengaged from the flange due to the enlargement at the end of the flange.

Figure 23:
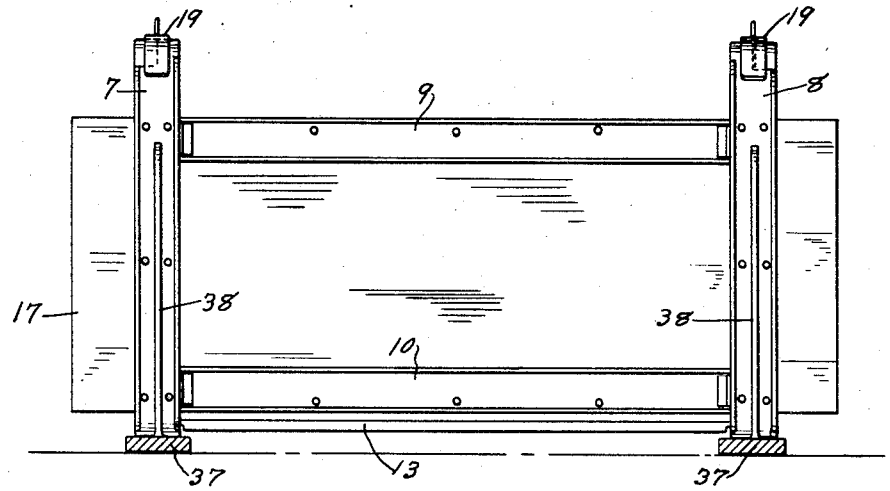
Fig. 23 is an end view of a floor rack for storing the said sheets and showing one of the folders in position therein.
Figure 24:
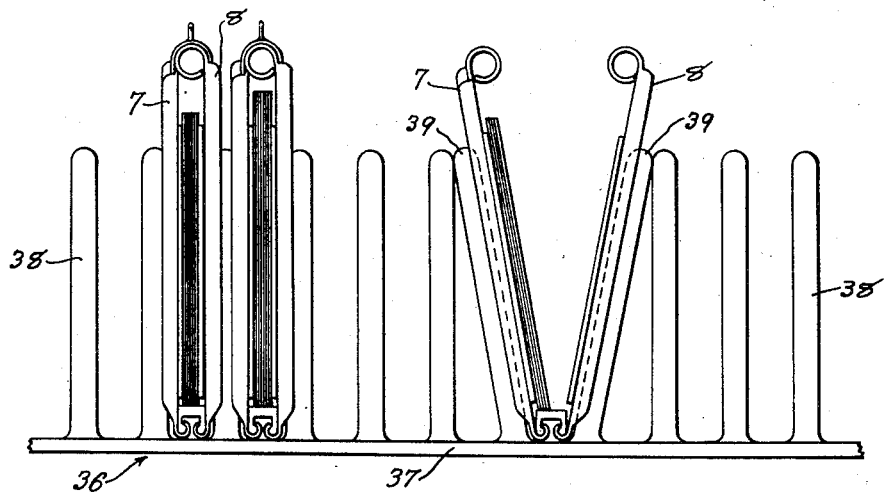
Fig. 24 is a side view of a portion of the floor rack showing folders therein and one of the folders in open position.

As illustrated in Figs. 23 and 24, I provide a floor rack 36 which consists of a pair of spaced parallel floor bars 37—37 having therein a plurality of spaced vertical posts 38 that are preferably flat in cross-section and adapted to fit between the side flanges of the vertical end bars 7 and 8 of the folder sides. The said bars 38 are spaced so as to receive the said folders therebetween and support them in closed position on the lower ends of the said vertical bars, as clearly shown in Fig. 24. In addition, the spaced rows of vertical bars 38 are provided, at desired intervals, with sets of bars 39—39 which are disposed at an angle to each other to form a V for receiving a folder and permitting it to be opened, as also shown in Fig. 24, so as to render the sheets therein accessible for removal from the folder.

In the novel method of handling and storing heavy sheets of material as provided by my invention, the following steps are performed, as illustrated in Figs. 13 to 21:

1. The transfer frame is first placed on the floor and the bottom bar is attached thereto, as shown in Fig. 13.
2. The crate with the sheet material therein is then placed upon the transfer frame, as shown in Fig. 14.
3. A folder side is then attached to the bottom bar and laid upon the material in the crate, as shown in Fig. 15.
4. The hoist bar is then connected and the entire assemblage is hoisted from the floor, as shown in Fig. 16.
5. The said assemblage is inverted and placed on the floor in reverse position and the hoist bar is detached therefrom, as shown in Fig. 17.
6. The transfer frame is then detached and removed from the assemblage, leaving the crate in upside down position upon the side of the folder, as shown in Fig. 18.
7. The crate is then removed, leaving the pack of sheets upon the side of the folder, as in Fig. 19.
8. The other side of the folder is then attached to the bar and placed upon the upper side of the pack of sheets, and the folder is secured in closed position by attaching one of the clips 19 over the adjacent loops 15 and 16 of each opposed set of end bars, as shown in Fig. 20.
9. The hoist bar is then connected to the closed folder and the entire folder is lifted, as shown in Fig. 21, and deposited into the floor rack for storage, as shown in Figs. 23 and 24.

When it is desired to draw the sheets of material from the folders in the said floor rack, the particular folder is lifted by the hoist and placed between the angled bars 39—39. The clips 19 are then removed, the folder is opened as shown in Fig. 24, and free access is thereby provided to the sheets contained within said folder. When desired, the said folder may be again closed and returned to its stored position in the said rack until more sheets are needed.

From the above description it will be clearly understood, particularly by those skilled in the art, that my invention provides a novel method of handling and storing sheet material which will materially expedite the handling of sheet material as well as materially reduce the amount of space required for storing said material. In addition, my invention will greatly facilitate the procurement of the desired sheets of material from a stored supply by rendering the said sheets directly accessible at all times, without necessitating the removal of other packs of sheets before access can be gained to those desired.

I claim:

1. A method of handling and storing sheet material in a folder which includes depositing an opened crate containing sheets of material upon a transfer frame, attaching a folder side to said frame and over said crate, then inverting the assemblage and depositing the sheets upon the said side, then removing the transfer frame and the crate and leaving the pack of sheets upon the side, and then attaching another folder side to the first side and over the pack of sheets to provide a folder therefor.

2. The method of handling and storing sheet material as set forth in claim 1 including the placing of said folder between relatively angled upright bars with the joined edges of the sides at the bottom to permit opening of the folder between said bars for rendering accessible the sheets in said folder.

3. A method of handling and storing sheet material in a folder which includes the steps of depositing an opened crate containing a pack of sheets of material upon a transfer frame, attaching a folder side to said frame and over said crate, then inverting the assemblage and depositing the sheets upon the said side, then removing the transfer frame and the crate and leaving the sheets upon the side, then attaching another folder side to the first side and over the pack of sheets to provide a folder therefor, and then depositing the said folder in a rack whereby it is held in a substantially vertical position.

4. A method of handling and storing sheet material in a folder which includes the steps of depositing an opened crate containing a pack of sheets of material upon a transfer frame, attaching a folder side to said frame and over said crate, then inverting the assemblage and the crate therebetween to deposit the sheets upon the said side, then removing the transfer frame and the crate and leaving the pack of sheets upon the side, and then attaching another folder side to the first side and over the pack of sheets by securing together only two adjacent edges of the said sides to provide a folder for the sheets.

5. A method of handling and storing sheet material in a folder which includes the steps of depositing an opened crate containing sheets of material upon a transfer frame, attaching a folder side to said frame and over said crate, then inverting the assemblage to deposit the sheets upon the said side, then removing the transfer frame and the crate and leaving the sheets upon the side, then attaching another folder side to the first side and over the sheets by securing two adjacent edges of said sides together to provide a folder for the sheets, then storing the said folder in a rack wherein it is held in a vertical position, and then transferring the said folder into another rack having relatively angled upright bars to permit opening of the folder between said bars for rendering accessible the sheets in said folder.

References Cited in the file of this patent

UNITED STATES PATENTS

| | | |
|---|---|---|
| 1,164,277 | Forsstrom | Dec. 14, 1915 |
| 1,560,028 | Doyle | Nov. 3, 1925 |
| 1,840,972 | Raymond | Jan. 12, 1932 |
| 1,847,812 | Burton et al. | Mar. 1, 1932 |
| 2,111,163 | Yecny | Mar. 15, 1938 |
| 2,370,698 | Vaughn | Mar. 6, 1945 |